(No Model.) 2 Sheets—Sheet 1.

A. BOLZANI.
BRAKE FOR HOISTS OR SIMILAR APPARATUS.

No. 606,268. Patented June 28, 1898.

Witnesses:
R. R. Johnson
Edw. P. Schwartz

Inventor
Anton Bolzani
by Herbert W. T. Jenner
Attorney (No Model.)

2 Sheets—Sheet 2.

A. BOLZANI.
BRAKE FOR HOISTS OR SIMILAR APPARATUS.

No. 606,268.

Patented June 28, 1898.

Witnesses:
R. R. Johnson
Edw. P. Schwartz

Inventor
Anton Bolzani
by Herbert W. T. Jenner
Attorney

UNITED STATES PATENT OFFICE.

ANTON BOLZANI, OF BERLIN, GERMANY.

BRAKE FOR HOISTS OR SIMILAR APPARATUS.

SPECIFICATION forming part of Letters Patent No. 606,268, dated June 28, 1898.

Application filed December 23, 1897. Serial No. 663,185. (No model.)

*To all whom it may concern:*

Be it known that I, ANTON BOLZANI, a subject of the King of Prussia, Emperor of Germany, residing at Berlin, Prussia, Germany, have invented certain new and useful Improvements in or Relating to Brakes for Hoists or Similar Apparatus; and I do hereby declare the following to be a full, clear, and exact description of the invention, such as will enable others skilled in the art to which it appertains to make and use the same.

This invention relates to a device for screw-thread brakes by means of which the lowering of the load is effected with the greatest possible and hitherto unattainable facility without jerks or shocks, and, besides, the stoppage of the load when desired is insured even when the hoist is moving quickly.

All brakes for hoists and the like acting by means of a screw-thread have the drawback that the pressure of the brake-surfaces against each other is effected too strongly by the screw unless the pitch of the screw-thread is so great that the brake is automatically driven back when it is applied, in which case, however, the braking action becomes ineffective. The consequence is that with a screw of fine pitch to release the brake a comparatively great effort must be applied, whereby the brake is also released too much, so that the lowering of the load takes place only by jerks or with the brake applied alternately too strongly and too lightly—that is to say, in a very unequal manner. The difference between the friction of quiescence and the friction of motion also makes itself unfavorably noticeable in this case, thus making the working still more unequal.

Figure 1:
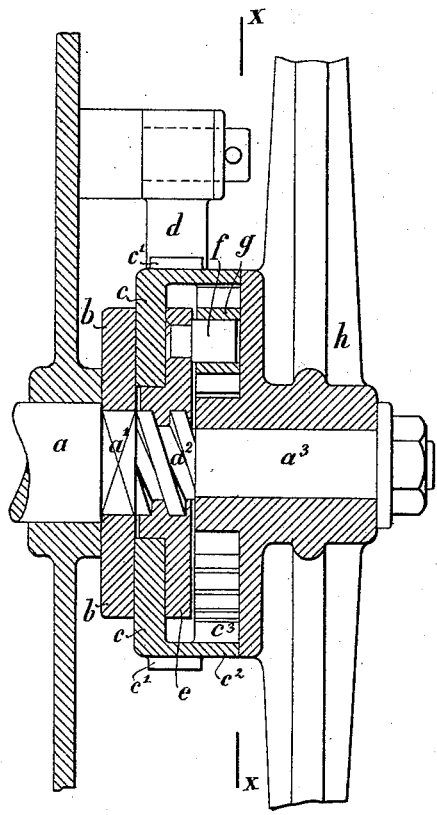
Figure 2:
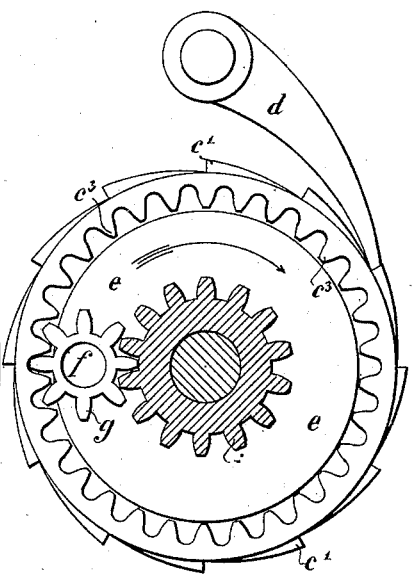
Figure 3:
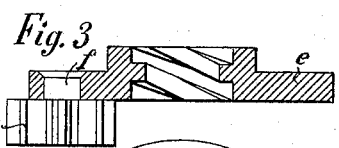
Figure 4:
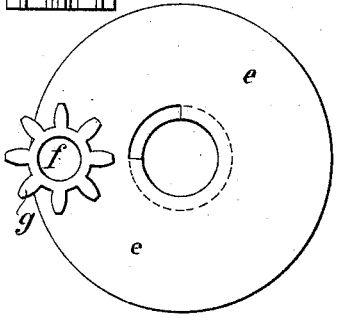
Figure 5:
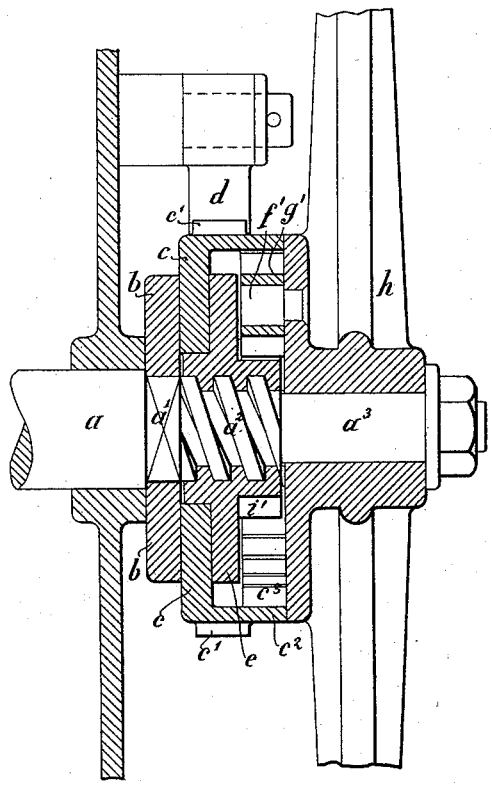

The device according to the present invention is shown in Figure 1 in axial section, and in Fig. 2 in section on the line $x\ x$ of Fig. 1 at right angles to the axis, Figs. 3 and 4 showing, respectively, a horizontal axial section and an elevation of the screw-threaded disk. Fig. 5 is a section similar to Fig. 1, but shows a modification.

On the squared portion $a'$ or the like of the shaft $a$ of the hoist is mounted a disk or a fixed collar $b$. Against this disk or collar rests a flanged disk $c$, provided on its circumference with ratchet-teeth $c'$, said disk or ratchet-wheel $c$ being capable of rotating only in the direction of hoisting, (indicated in Fig. 2 by an arrow,) a pawl $d$, pivoted to the frame, engaging with its teeth and preventing it from rotation in the opposite direction. On a screw-threaded portion of the shaft $a^2$ is mounted a screw-threaded disk $e$, which when rotating in the direction of the arrow presses against the disk $c$ owing to the direction of the screw-thread, the latter disk $c$ being thus clamped between said disk $e$ and the fixed collar $b$ on the shaft.

To cause the disks to engage with each other or to become disengaged, the following mechanism is employed: The disk $c$ has a cylindrical flange $c^2$, with inner circumferential teeth $c^3$, with which engages a toothed pinion $g$. The latter is mounted loosely on a stud $f$, secured to the screw-threaded disk $e$ and rolls on the inner toothed rim $c^3$ in whatever direction rotation takes place. The hand chain-wheel, crank, or the like driving part $h$ of the hoist is mounted loosely on an extension $a^3$ of the shaft $a$ and is secured to a spur-wheel $i$, which also engages with the pinion $g$. If the hand chain-wheel or the like is turned in one or in the other direction, the pinion $g$ is caused to rotate, owing to its engagement with the spur-wheel $i$, and the pin $f$ moves in the same direction as the pinion rolls on the toothed rim $c^3$. The result will be that the disk $e$ will also participate in this movement, and, according to the direction of movement, it will move on the screw-threaded portion of the shaft either toward the brake-disk $c$ or away from it, so that the brake will be either applied or disengaged.

The arrangement of the described annular gearing for actuating the brake has the important advantage that the force to be applied at the hand-wheel for applying or disengaging the brake is very small, so that the risk of too great a pressure or too sudden release is prevented. The annular gearing acts, moreover, as a regulating device, as owing to the rate of transmission required the hand-wheel must make twice as many revolutions under the assumption that the load exercises a driving effort, as the disk $e$, whereby a considerable resistance is offered by the hand-wheel, said resistance being still increased by the hand-chain passing through the chain-guides when moving very quickly. The consequence is that even when the workman causes the hand-chain to move with a great speed no injurious effects of the momentum of the moving masses become noticeable, as the disk *e* always lags behind the hand-wheel, so that the load causes an automatic screwing and braking action.

In the modification shown in Fig. 5 the part which serves as a locking-nut is secured to the toothed wheel *i'* and the driving part of the machine carries the pin *f'* and pinion *g'*. This construction gives a different rate of transmission, and all the other parts and their functions remain unaltered.

What I claim is—

1. The combination, with a shaft provided with a screw-threaded portion and having a disk secured to it, of a screw-threaded disk mounted on the said screw-threaded portion, a brake-disk arranged between the two said disks and provided with means for preventing it from revolving in one direction and an internal toothed wheel, an external toothed wheel arranged concentric with the said shaft, a gyratory and revoluble toothed pinion gearing into the two said wheels, and means for supporting and gyrating the said pinion about the said shaft, substantially as set forth.

2. The combination, with a shaft provided with a screw-threaded portion and having a disk secured to it, of a screw-threaded disk mounted on the said screw-threaded portion, a brake-disk arranged between the two said disks and provided with means for preventing it from revolving in one direction and an internal toothed wheel, an external toothed wheel arranged concentric with the said shaft, a pin projecting laterally from the said screw-threaded disk, a toothed pinion mounted on the said pin and gearing into the two said wheels, and means for revolving the said external toothed wheel, whereby the said pinion is both revolved and gyrated, substantially as set forth.

In testimony whereof I have affixed my signature in presence of two witnesses.

ANTON BOLZANI.

Witnesses:
 REINHARD WAGNITZ,
 OSCAR SCHMIDT.